(12) United States Patent
Ball (10) Patent No.: US 7,325,413 B2
(45) Date of Patent: Feb. 5, 2008

(54) APPARATUS FOR MAKING ICE CREAM HAVING AN IMPROVED DISPENSER

(75) Inventor: Alan Ball, Sommerville, MA (US)

(73) Assignee: Conair Corporation, Stamford, CT (US)

( * ) Notice: Subject to any disclaimer, the term of this patent is extended or adjusted under 35 U.S.C. 154(b) by 501 days.

(21) Appl. No.: 10/740,928

(22) Filed: Dec. 18, 2003

(65) Prior Publication Data

US 2005/0132901 A1 Jun. 23, 2005

(51) Int. Cl.
*A23G 9/12* (2006.01)
(52) U.S. Cl. .................. 62/342; 366/195; 366/189
(58) Field of Classification Search .......... 62/342–343; 222/333, 390; 366/189, 195, 196
See application file for complete search history.

(56) References Cited

U.S. PATENT DOCUMENTS

| | | | |
|---|---|---|---|
| 4,391,575 A * | 7/1983 | Osrow | 425/190 |
| 4,632,566 A * | 12/1986 | Masel et al. | 366/149 |
| 4,669,275 A * | 6/1987 | Ohgushi et al. | 62/342 |
| 4,910,973 A * | 3/1990 | Osrow et al. | 62/342 |
| 4,920,761 A | 5/1990 | Bukoschek et al. | 62/342 |
| 5,464,120 A * | 11/1995 | Alpers et al. | 222/1 |
| 6,041,614 A | 3/2000 | Yamaya et al. | 62/340 |
| 6,250,794 B1 * | 6/2001 | Huang | 366/149 |
| 2006/0006199 A1 * | 1/2006 | Shin | 222/390 |

* cited by examiner

*Primary Examiner*—William E. Tapolcai
(74) *Attorney, Agent, or Firm*—Lawrence Cruz (57) ABSTRACT

An ice cream maker for making ice cream having a vessel, a motor being connected to a dasher in the vessel and a housing for housing the vessel and the motor. The housing has an inlet, an outlet and a valve at the outlet. When said valve is actuated, the ice cream is released from the vessel out of the outlet.

11 Claims, 7 Drawing Sheets

APPARATUS FOR MAKING ICE CREAM HAVING AN IMPROVED DISPENSER

BACKGROUND OF THE INVENTION

1. Field of the Invention

The present invention relates to an apparatus for making ice cream. More particularly, the present invention relates to an ice cream maker having an ice cream dispenser that facilitates removal of the ice cream product for enjoyment by a user.

2. Description of the Related Art

Ice cream makers are known in the art. Various types of ice cream makers have cooling and heating devices for home use. One such attempt in the art is U.S. Pat. No. 4,920,761 to Bukoschek.

However, such an ice cream maker is deficient because of the ice cream maker's inconvenient operation. The removal of the ice cream is messy because the user must manually lift the ice cream out the container through the cover by placing the user's hand in the container. Also, this ice cream maker results in increased waste. Due to the size of the ice cream scoop, the user will have a difficult time in removing all of the ice cream from the container because an amount of ice cream will collect and aggregate underneath the shaft and the impeller. This results in the user physically lifting the heavy and bulky ice cream maker to empty the contents.

Further, the user's clothes may become soiled by manually placing the user's hand or arm on a side of the container when removing the ice cream from the container through the cover. Furthermore, there is a risk that the user will drop the scoop or other foreign materials in the container thus possibly contaminating the ice cream in the container.

It is desired to provide an ice cream maker having a dispenser that requires a minimum amount of effort by the user to empty the ice cream located therein. It is also desired to provide an ice cream maker having a dispenser that conveniently facilitates operation of the ice cream maker.

SUMMARY OF THE INVENTION

It is an object of the present invention to provide an ice cream maker that selectively allows the extraction of ice cream without any scooping of the ice cream or physically lifting the ice cream from the ice cream maker.

It is another object of the present invention to provide an ice cream maker with a valve that selectively allows the extraction of ice cream.

It is still another object of the present invention to provide an ice cream maker that has a piston to selectively displace ice cream out of an outlet of the ice cream maker.

It is a further object of the present invention to provide an ice cream maker having a valve connected to a tab that selectively allows the extraction of ice cream through the valve and simultaneously actuates the piston to displace the ice cream out of an outlet of the ice cream maker.

These and other objects and advantages of the present invention are achieved by an apparatus for making ice cream that has a cylindrical freezing vessel made from a thermally conductive material, and a reversible motor having an output drive shaft with the output drive shaft being connected to a threaded rod. The threaded rod extends into the cylindrical freezing vessel and is connected to a first dasher guide and a second dasher guide. The first dasher guide and second dasher guide are each connected to both first and second dashers in the cylindrical freezing vessel. The first and second dashers in the cylindrical freezing vessel rotate to scrape an inner wall of the cylindrical freezing vessel. The ice cream maker also has a valve at an outlet of the cylindrical freezing vessel. The valve moves from a first or closed position to a second or opened position where the valve releases the ice cream out of the apparatus.

DETAILED DESCRIPTION OF THE INVENTION

Figure 1:
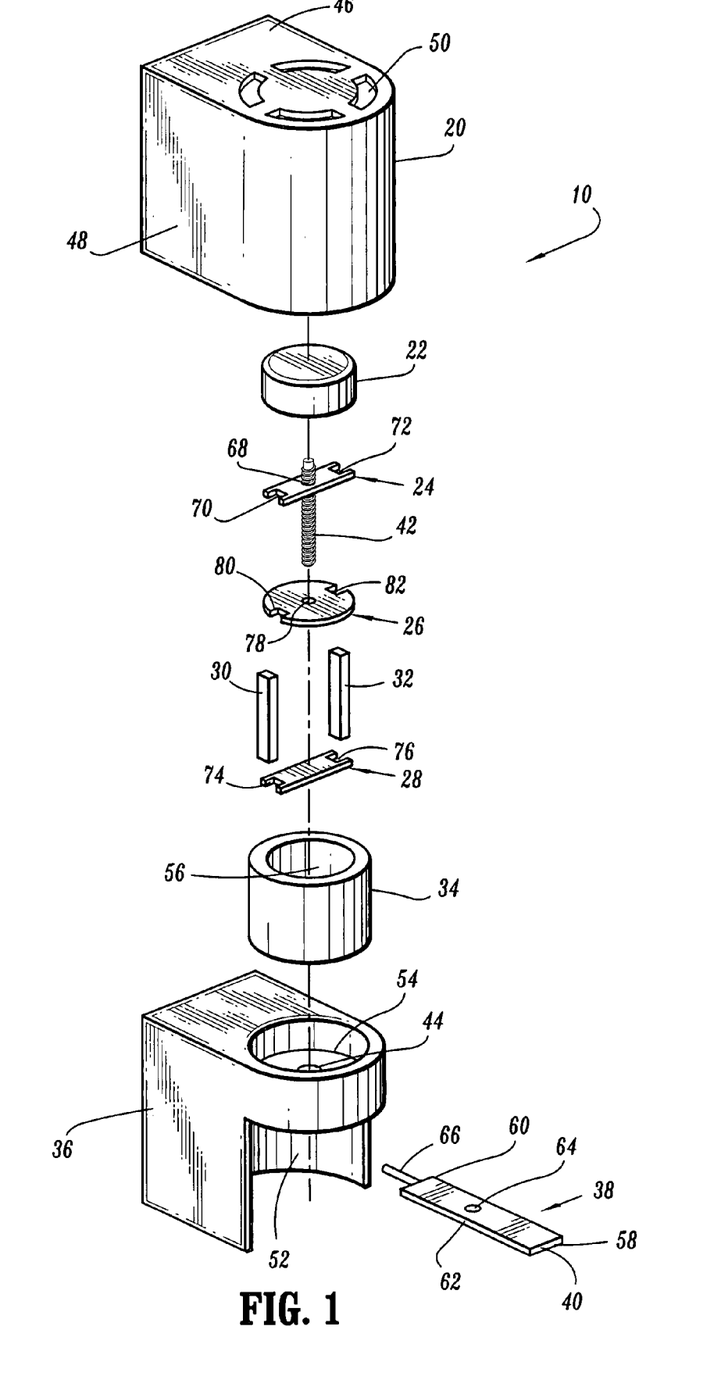
FIG. 1 is an exploded view of an ice cream maker according to the present invention.

Referring to the drawings and in particular to FIG. 1, there is provided an electrically operated ice cream maker generally represented by reference numeral 10. Preferably, the ice cream maker 10 is a portable unit. However, one skilled in the art should know that the ice cream maker 10 may also be a fixed unit or commercial unit. The ice cream maker 10 has a cover 20, a motor 22, a first dasher guide 24, a piston 26, a second dasher guide 28, a first dasher 30, and a second dasher 32. The ice cream maker 10 has a freeze cylinder 34, a base 36, a valve 38 preferably with a tab 40, a threaded rod 42, and an outlet 44.

The ice cream maker 10 is shown in an exemplary embodiment as an automatic ice cream maker with the motor 22 preferably being an electric motor. However, one skilled in the art should appreciate that the ice cream maker 10 may be a manual or a semi-automatic ice cream maker. Referring to FIG. 1, the cover 20 has a top 46, a bottom 48, and an interior space 45 shown in FIG. 2. In top 46, there are a number of apertures 50 or an inlet for the initial introduction of an ice cream product into the ice cream maker 10. Each aperture 50 is preferably a radial slot. The apertures 50 are arranged in a circular fashion on the top 46 of the cover 20. One skilled in the art should appreciate that any number of apertures 50 having any size or configuration can be used and is in the scope of the present invention.

Preferably, the cover 20 is removably disposed on the base 36. Both the cover 20 and base 36 are together on a flat surface, such as a residential kitchen counter, a desk, a table or on the floor. The base 36 is shown as a substantially upside down "L" shaped member. However, one skilled in the art should appreciate that the base 36 may have any shape known in the art. The base 36 has a space 52 on a side of the base that has a size at least sufficient to permit a cone or a bowl to rest therein adjacent to the base. The base 36 has a slot 54 in a top of the base.

One skilled in the art should appreciate that the base 36 may be made from any resilient material known in the art, such as a thermoplastic, a thermoset, a metal, steel or a composite material.

The slot 54 is in mating engagement with the freeze cylinder 34 that slides in the slot. The slot 54 is shown as generally circular in shape and has a diameter that is complementary in size to a diameter of the freeze cylinder 34. In this manner, the cover 20 with the freeze cylinder 34 in the cover may be fastened on the base 36. One skilled in the art should appreciate that the slot 54 although shown as generally circular could have any shape or size known in the art.

The slot 54 has the outlet 44 therein. In use, the consumer may selectively place an ice cream cone or bowl to selectively deposit ice cream in the ice cream cone or bowl.

The ice cream maker 10 has the freeze cylinder 34 in the cover 20. The ice cream mixing product is preferably deposited through the number of apertures 50 of the cover 20 to enter the freeze cylinder 34. Once in the freeze cylinder 34, the ice cream mixing product is made into ice cream of a sufficient consistency and temperature for consumption.

The freeze cylinder 34 is preferably cooled by an external cooling device (not shown) such as a household freezer. The cooling device preferably cools the freeze cylinder 34 to a temperature of a conventional freezer a sufficient amount to bring a portion of the ice cream mixing product on an inner wall 56 of the freeze cylinder 34 below a freezing temperature of the ice cream mixing product. In one embodiment of the present invention, the freeze cylinder 34 may be removably separated from the ice cream maker 10 and disposed in a freezer section of a refrigerator. In another embodiment of the present invention, the ice cream maker 10 may have an integrated cooling device (not shown) that cools the freeze cylinder 34 in the ice cream maker. In still another embodiment of the present invention, the ice cream maker 10 and/or the freeze cylinder 34 may be placed in its entirety into a suitable cooling device for cooling.

Preferably, the freeze cylinder 34 is a vessel for holding the ice cream mixing product therein and preferably is made from a thermally conductive material such as a metal, aluminum, steel, an alloy or any combinations thereof.

As is shown in FIG. 1, the valve 38 has a rectangular body 62 with an aperture 64, a proximal end 58, a distal end 60, and a post portion 66. The valve 38 further has a tab 40 being at the distal end 60. The aperture 64 is preferably complementary in size to a diameter of the outlet 44. Thus, the valve 38 selectively allows the ice cream made in the freeze cylinder 34 (from the ice cream mixing product) to escape through the valve.

Referring to FIG. 1, the cover 20 of the ice cream maker 10 has the motor 22 disposed therein. The motor 22 is preferably an electric reversible motor. The motor 22 has an input connected to a power supply (not shown) and an output connected to a ground. The motor 22 is preferably in the cover 20 and preferably is above both the base 36 and the freeze cylinder 34, as shown in FIG. 1. The motor 22 has a motor output shaft (not shown) preferably connected to the threaded rod 42 for rotating the threaded rod in either a clockwise or counterclockwise rotational direction. The threaded rod 42 extends opposite the motor 22 and into the freeze cylinder 34.

Preferably, ice cream is formed in the freeze cylinder 34 by mixing the ice cream mixing product in the cooled freeze cylinder by the motor 22. The ice cream that forms on the inner wall 56 is scraped and mixed back into the mixture in a continuous fashion by the first and second dashers 30, 32 until only ice cream with a required consistency remains. To effect this mixing, as one skilled in the art should appreciate, the ice cream maker 10 has the first-dasher guide 24 and the second dasher guide 28 both connected to the first and second dashers 30, 32. The threaded rod 42 is connected to the motor 22 and is placed through the first dasher guide 24. The threaded rod 42 is placed through an aperture 68 in the first dasher guide 24. The first dasher guide 24 has a first notch 70 and a second notch 72. The first notch 70 and the second notch 72 are located at opposed ends of the first dasher guide 24. In this manner, the first dasher 30 is connected in the first notch 70 and the second dasher 32 is connected in the second notch 72.

The second dasher guide 28 has a third notch 74 and a fourth notch 76. The third notch 74 and the fourth notch 76 are located at opposed ends of the second dasher guide 28. The first and the second dashers 30, 32 are disposed in the respective third notch 74 and the fourth notch 76 in a longitudinal manner. Preferably, the first and second dashers 30, 32 are parallel to the threaded rod 42 to scrape the inner wall 56. The first and second dashers 30, 32 preferably rotate to scrape the freezing ice cream off the inner wall 56 of the freeze cylinder 34 and to mix the ice cream mixing product located therein. The first and second dashers 30, 32 preferably are longitudinal members. Each of the first and second dashers 30, 32 have a suitable length to fit in the freeze cylinder 34 and scrape the entire inner wall 56 and mix the ice cream product in the freeze cylinder. The first and second dashers 30, 32 are each made from a resilient material such as a metal material, a thermoplastic material, a rubber, a thermoset, a composite material, or any combinations thereof.

The piston 26 is a cylindrical shaped, resilient member. The piston 26 has an aperture 78 disposed therethrough. Most preferably, the piston 26 is a positive displacement piston. However, one skilled in the art should appreciate that the piston 26 may be any piston known in the art. The piston 26 dispenses the ice cream. The piston 26 preferably displaces the ice cream from the freeze cylinder 34 through the valve 38. The piston 26 has a first notch 80 and a second notch 82. The first notch 80 is disposed at a first radial location of the piston 26 and the second notch 82 is disposed at a second radial location of the piston opposite the first notch.

Figure 2:
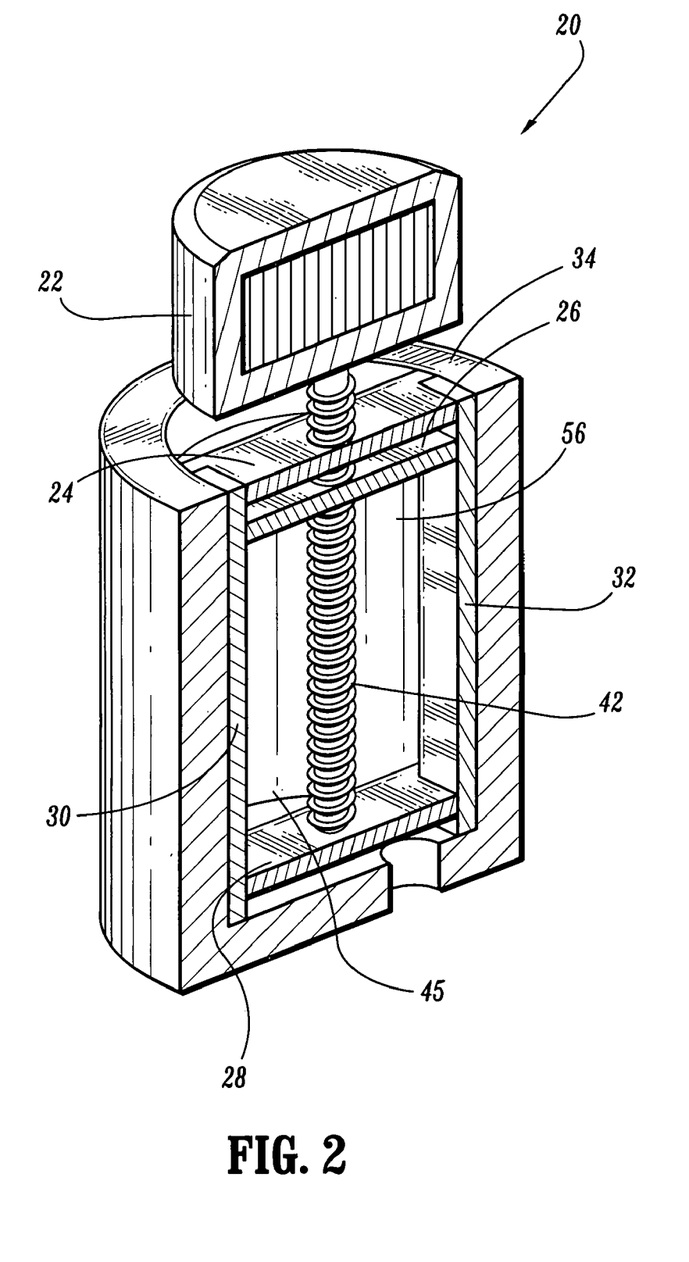
FIG. 2 is a perspective cross-sectional view of a cover of the ice cream maker of FIG. 1.

Referring to FIG. 2, the piston 26 may selectively be displaced or moved from a first elevated position on the threaded rod 42 to a second lowered position on the threaded rod. The piston 26 is displaced by a clockwise rotation of the piston conveyed by the threaded rod 42 that is turned by the motor 22. The piston 26 rotates on a number of threads of the threaded rod 42. The aperture 78 of the piston 26 engages in a complementary fashion with the threaded rod 42 and thus moves the piston down the threaded rod in a direction toward the valve 38.

Figure 3:
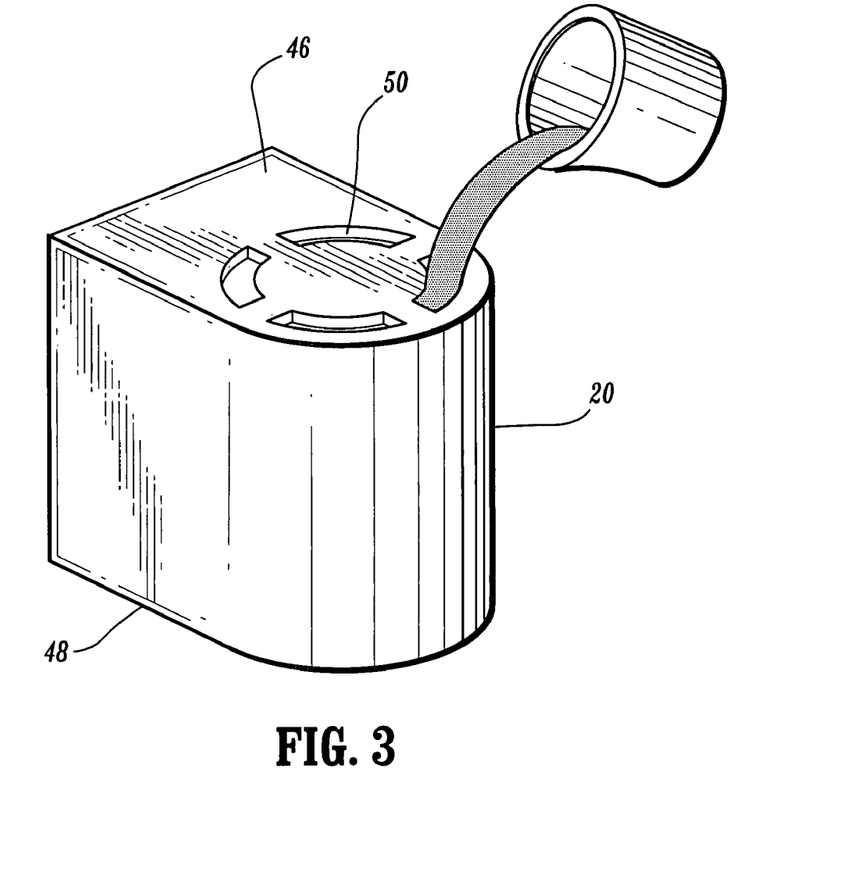
FIG. 3 is a perspective view of the cover of FIG. 1 receiving an ice cream mixing product.

Referring to FIG. 3, the ice cream mixing product is introduced as is shown by manually pouring the ice cream mixing product into the aperture 50 from a suitable container. As is known, the ice cream mixing product typically is in liquid form and is either homemade or purchased commercially.

Figure 4:
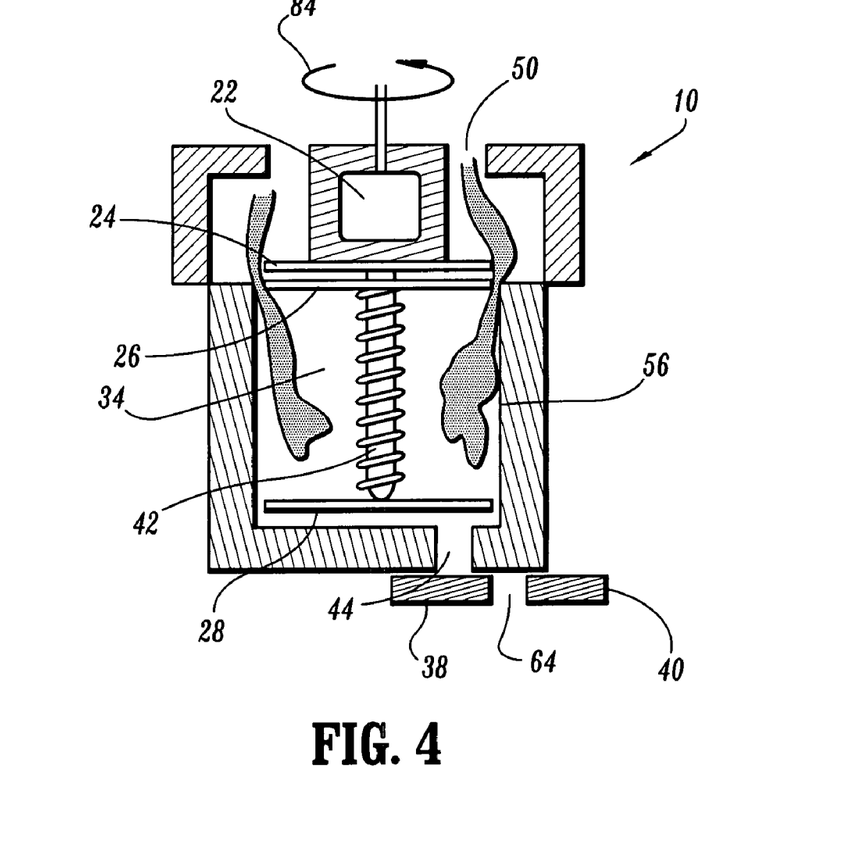
FIG. 4 is a front cross-sectional view of the cover of FIG. 1 with a valve in a closed position.

Referring to FIG. 4, the valve 38 is initially set or pushed at the tab 40 by the user to a first closed position. In this closed position, the valve 38 blocks the ice cream product in the freeze cylinder 34. Thus, the valve 38 prevents the ice cream product from escaping through the outlet 44. Contemporaneously, the motor 22 is rotating the threaded rod 42 in the counterclockwise rotational direction as indicated by arrow 84. This direction 84 of the motor 22 causes the threaded rod 42 to rotate in similar fashion as the motor in a counterclockwise manner. This rotation of the threaded rod 42 causes the first and second dashers 30, 32 to turn and rotate. The first and second dashers 30, 32 then scrape the inner wall 56 of the freeze cylinder 34. In this manner, the first and second dashers 30, 32 mix the ice cream mixing product while leaving the piston 26 in the first elevated position as shown.

Figure 5:
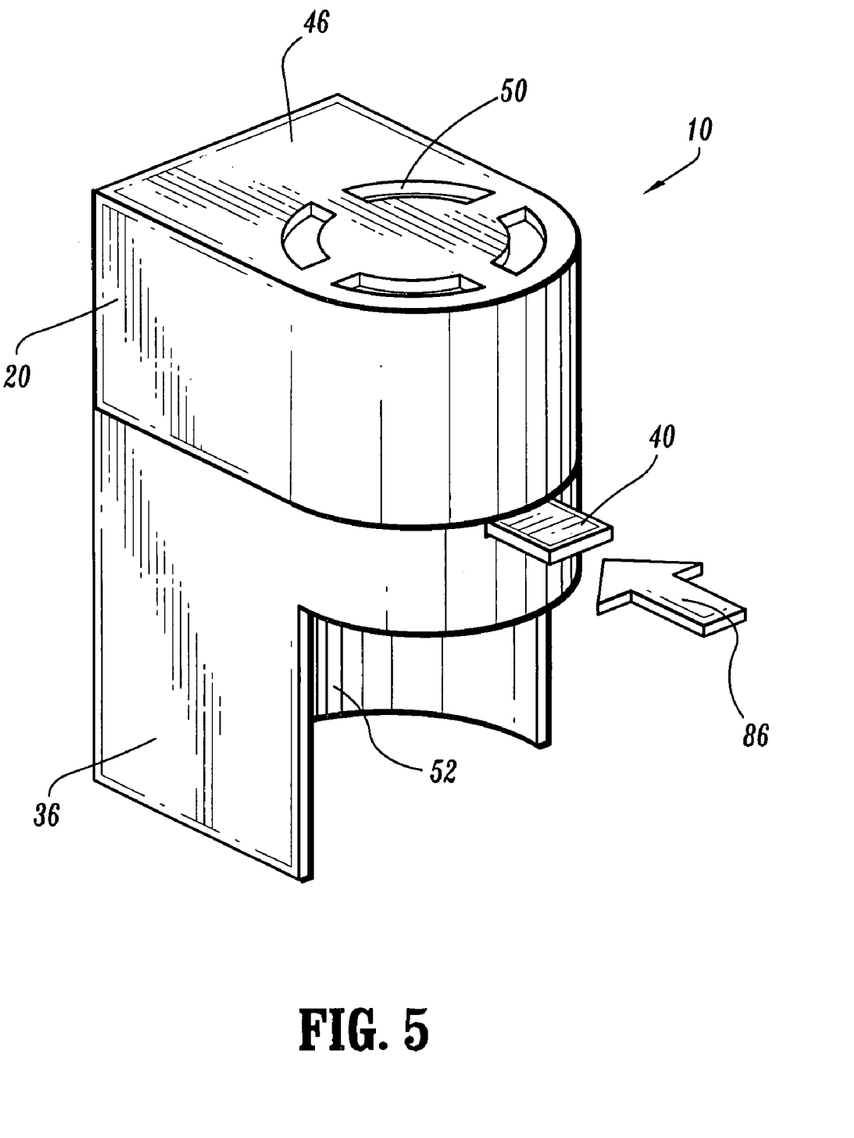
FIG. 5 is a perspective view of the ice cream maker having the valve with a tab of FIG. 1 being depressed to release the ice cream in the ice cream maker into the notch.

Referring to FIG. 5, the ice cream maker 10 has the tab 40 extending outwardly therefrom. Based upon either a visual monitoring of the ice cream or by way of an expiration of a predetermined time frame, the user will wish to remove or dispense the completed ice cream made in the ice cream maker. By depressing tab 40 as indicated by reference arrow 86, the aperture 64 of the valve 58 shown in FIG. 4 will align with the outlet 44. By pushing tab 40 in the direction of reference arrow 86 shown in FIG. 6, the valve 38 moves in a lateral direction as indicated, such that the aperture 64 of the valve 38 is aligned with the outlet 44 of the base 36. The ice cream will escape through the outlet 44 and the aperture 64 into the space 52 of the base 36. Thus, the user collects the ice cream in the bowl, the cup or the ice cream cone therefrom.

Figure 6:
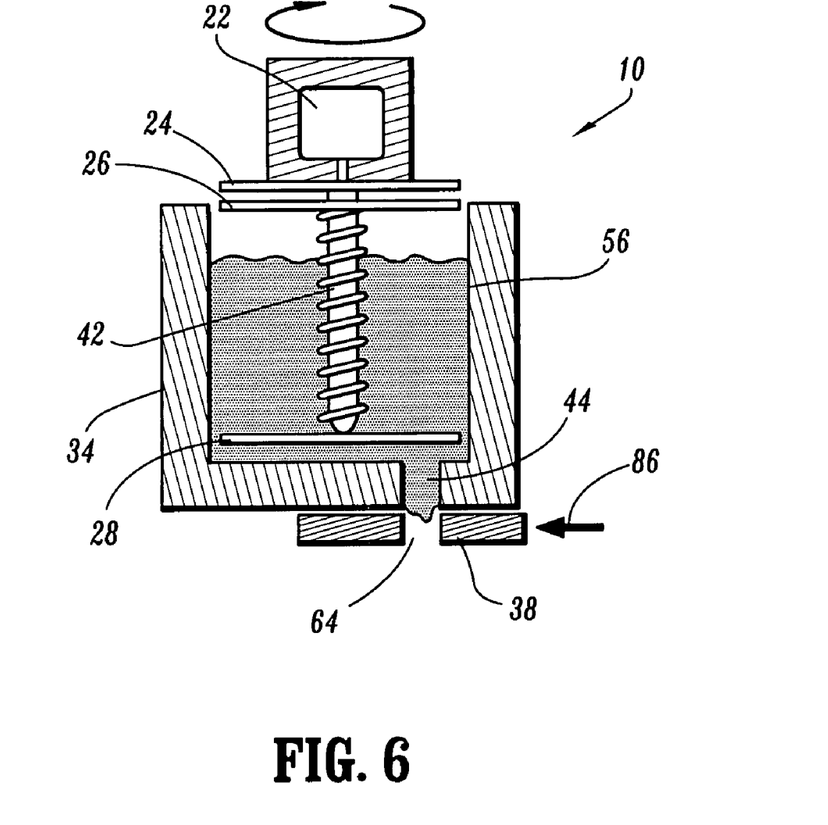
FIG. 6 is a front cross-sectional view of the ice cream maker of FIG. 1 having the valve in an open position.

Due to a relatively high resistance to the flow of the ice cream, the ice cream may have difficulty escaping the outlet 44. To remedy this resistance to flow, upon being pushed in the lateral direction (as indicated by reference arrow 86) the valve 38 will actuate the motor 22. The motor 22 will then rotate in an opposite direction. In this embodiment, the motor 22 will rotate from the counterclockwise rotational direction to the opposite direction or clockwise rotational direction. This change in a direction of the rotation of the motor 22 will change the rotation of the threaded rod 42. The threaded rod 42 will rotate from the initial direction to an opposite direction. In this embodiment, the threaded rod 42 will rotate from the counterclockwise rotational direction to the clockwise rotational direction.

Figure 7:
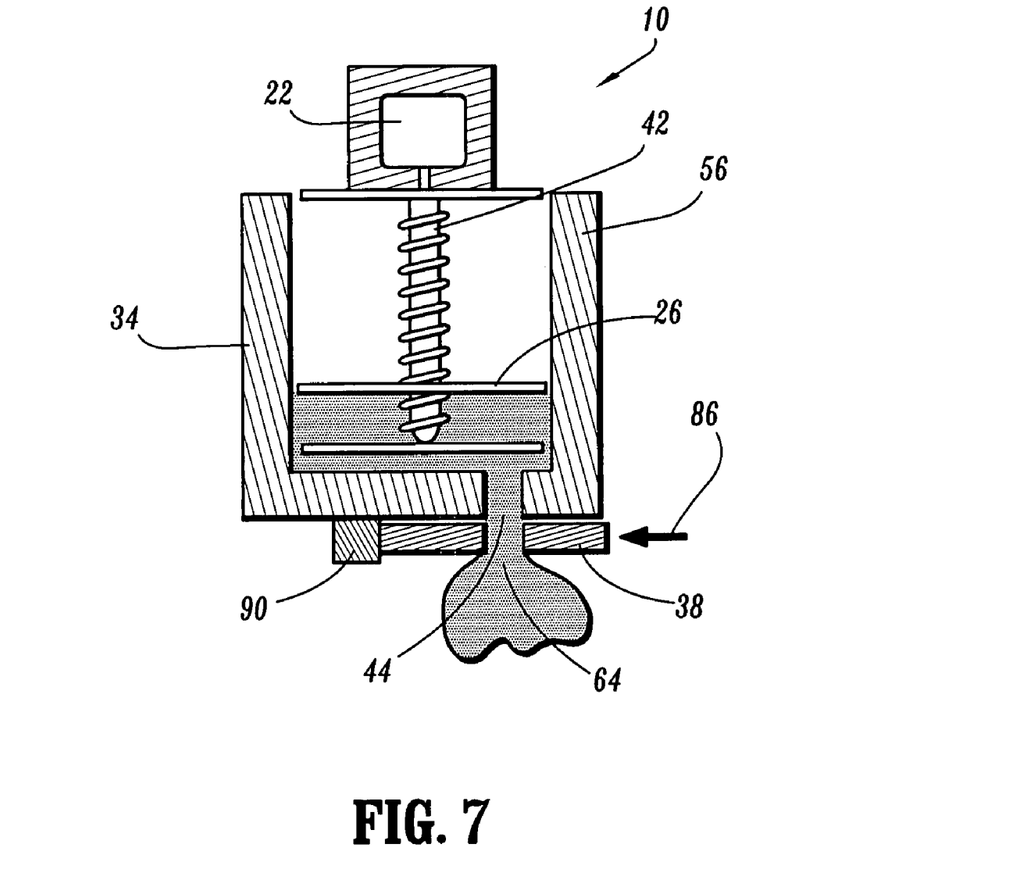
FIG. 7 is a front cross-sectional view of the ice cream maker of FIG. 6 with the ice cream contents released through the valve.

Referring to FIG. 7, the piston 26 moves from the first elevated position to the second lowered position when the threaded rod 42 rotates in the opposite direction. The piston 26 lowers itself and displaces the ice cream. The piston 26 forces a volume of the ice cream out of the outlet 44 and valve 38 as shown. The ice cream is then ejected from the ice cream maker in a clean, quick and neat fashion into the slot 54 being shown in FIG. 1. Upon receipt of an amount of ice cream, the consumer releases the tab 40 and seals the outlet 44. In another embodiment of the present invention, the valve 38 may be connected to a biasing device 90. Preferably, the biasing device 90 will close the outlet 44 with the valve 38 upon release of the tab 40. The valve 38 seals the freeze cylinder 34 and stores the remainder of the made ice cream therein.

In another embodiment of the present invention, the piston 26 may alternatively serve as a mixer for other added ingredients, or toppings. Upon completion of making the ice cream, the user may deposit one or more ice cream ingredients or toppings in the number of apertures 50 for introduction to the ice cream. The ingredients or toppings may include sprinkles, jimmies, candy, cookies, caramel, a flavor, a coloring, fudge or any other ice cream ingredients or toppings known in the art. Upon depositing the pre-selected ingredients or toppings, the user may push the valve 38 by the tab 40 to actuate the piston 26. The piston 26 would then preferably mix the ingredients or toppings with the ice cream. In another alternative embodiment of the present invention, the ice cream maker 10 may have a compartment (not shown) in the base 36 or in the cover 20. The compartment may be any size or shape and selectively stores one or more ingredients or toppings listed above to introduce in the freeze cylinder 34.

A preferred feature of the present invention is that the ice cream maker 10 permits a rapid and easy method of removing or dispensing the ice cream made therein. The ice cream maker 10 easily allows the user to push the tab 40 that actuates the valve 38. The valve 38 permits the ice cream to flow out of the outlet 44. Thus, there is an easy, quick, and clean removal of the ice cream for deposit on, for example, an ice cream cone or a bowl. Also, a user does not have to open any cover of the ice cream maker 10 and manually scoop and/or lift the ice cream from the ice cream maker into the ice cream cone, cup, or bowl.

It should be understood that the foregoing description is only illustrative of the present invention. Various alternatives and modifications can be devised by those skilled in the art without departing from the invention. Accordingly, the present invention is intended to embrace all such alternatives, modifications and variances.

What is claimed is:

1. A portable ice cream maker for making ice cream comprising: a vessel having a dasher; a motor being connected to the dasher; a housing for housing said vessel and said motor, said housing having an inlet, an outlet and a valve at said outlet, wherein the ice cream is released from said vessel through said outlet when said valve is actuated, wherein the dasher is connected to said motor by a threaded rod; and a piston, said piston being connected to said threaded rod, wherein the dasher is a first longitudinal member and a second longitudinal member, said first and said second longitudinal members scraping an inner wall of said vessel for mixing and for providing a consistency of the ice cream, wherein said motor is reversible, said reversible motor rotating said threaded rod in a first motor position and a second motor position, wherein said threaded rod is operable to rotate from a first threaded rod position to a second threaded rod position in response to an actuation of said valve.

2. The portable ice cream maker of claim 1, wherein said piston moves in response to a change of said rotation of said threaded rod from a first piston position to a second piston position, said piston displacing the ice cream out of said outlet upon moving from said first piston position to said second piston position when said threaded rod rotates from said first threaded rod position to said second threaded rod position, said piston rotating on a thread of said threaded rod.

3. A portable ice cream maker for making ice cream comprising: a vessel having a dasher; a motor being connected to the dasher; a housing for housing said vessel and said motor, said housing having an inlet, an outlet and a valve at said outlet, wherein the ice cream is released from said vessel through said outlet when said valve is actuated, wherein the dasher is connected to said motor by a threaded rod; and a piston, said piston being connected to said threaded rod, wherein the dasher is a first longitudinal member and a second longitudinal member, said first and said second longitudinal members scraping an inner wall of said vessel for mixing and for providing a consistency of the ice cream, wherein said first longitudinal member and said second longitudinal member are connected to one another by a first guide, said first guide being a lateral member disposed through said threaded rod, said first guide having a first notch at a first end and a second notch at a second end, said first longitudinal member and said second longitudinal member being connected to said first notch and said second notch, respectively.

4. The portable ice cream maker of claim 3, further comprising a second guide having a third notch and a fourth notch, said first longitudinal member being connected to said third notch and said second longitudinal member being connected to said fourth notch, said first longitudinal member and said second longitudinal member being positioned to scrape said inner wall of said vessel.

5. An ice cream maker for making ice cream comprising: a cylindrical freezing vessel made from a thermally conductive material, said cylindrical freezing vessel having an outlet and an inner wall; a reversible motor having an output drive shaft, said output drive shaft being connected to a threaded rod, said threaded rod extending into said cylindrical freezing vessel, said threaded rod being connected to a first dasher guide and a second dasher guide, said first dasher guide and said second dasher guide both being connected to a first dasher and a second dasher in said cylindrical freezing vessel, said first dasher and said second dasher rotating to scrape said inner wall of said cylindrical freezing vessel; and a valve in spaced relation to said outlet of said cylindrical freezing vessel, said valve moving from a first valve position to a second valve position, wherein said valve releases the ice cream out of said outlet when at said second valve position.

6. The ice cream maker of claim 5, wherein said valve actuates said reversible motor from a first motor operating condition to a second motor operating condition.

7. The ice cream maker of claim 6, wherein said reversible motor rotates when at said first motor operating condition in a manner selected from the group consisting of a clockwise manner, a counterclockwise manner, and any combination thereof, and wherein said reversible motor rotates in an opposite manner when at said second motor operating condition relative to said first motor operating condition, said threaded rod rotating in a direction that is substantially similar a direction as said motor.

8. The ice cream maker of claim 7, further comprising a piston, said piston moving on said threaded rod when said reversible motor is actuated by said valve.

9. The ice cream maker of claim 8, wherein said piston displaces the ice cream in said cylindrical freezing vessel and out of said outlet when moving from a first piston position to a second piston position on a thread of said threaded rod.

10. An ice cream maker for making ice cream comprising: a vessel made from a thermally conductive material; a reversible motor having an output drive shaft, said output drive shaft being connected to a threaded rod, said threaded rod extending into said vessel, said threaded rod being further connected to a piston and a plurality of dasher guides, said plurality of dasher guides being connected to a plurality of dashers in said vessel by a plurality of notches on said plurality of dasher guides, said plurality of dashers rotating in response to a rotation in a first motor direction to scrape an inner wall of said cylindrical freezing vessel; and a valve at an outlet of said vessel being engageable from a first valve position to a second valve position, said valve at said first valve position sealing said outlet, said valve at said second valve position traversing a predetermined distance to open said outlet, said valve actuating said reversible motor to rotate in a second motor direction, said second motor direction being opposite said first motor direction for displacing said piston in said vessel, said piston traversing on said threaded rod in a first piston direction to a second piston direction, said first piston direction being located opposite said outlet, said second piston direction being located toward said outlet, said piston traversing from said first piston direction to said second piston direction releasing the ice cream out of said outlet.

11. The ice cream maker of claim 10, wherein said valve is connected to a tab extending outwardly from the ice cream maker, said tab being biased to be selectively depressed by a user from said first valve position to said second valve position.

* * * * *